(12) United States Patent
Fiorenza

(10) Patent No.: US 12,447,301 B2
(45) Date of Patent: Oct. 21, 2025

(54) FLOW INTERRUPTION VALVE

(71) Applicant: SMART RS INC., Ottawa (CA)

(72) Inventor: Francesco Fiorenza, Ottawa (CA)

(73) Assignee: SMART RS INC., Ottawa (CA)

( * ) Notice: Subject to any disclaimer, the term of this patent is extended or adjusted under 35 U.S.C. 154(b) by 939 days.

(21) Appl. No.: 17/587,277

(22) Filed: Jan. 28, 2022

(65) Prior Publication Data

US 2022/0241544 A1 Aug. 4, 2022

Related U.S. Application Data

(60) Provisional application No. 63/143,129, filed on Jan. 29, 2021.

(51) Int. Cl.
| | | |
|---|---|---|
| *A61M 16/20* | (2006.01) | |
| *A61M 16/08* | (2006.01) | |
| *A61M 39/28* | (2006.01) | |
| *F16K 1/36* | (2006.01) | |

(52) U.S. Cl.
CPC ...... *A61M 16/0816* (2013.01); *A61M 16/201* (2014.02); *A61M 39/284* (2013.01); *F16K 1/36* (2013.01); *A61M 2205/0216* (2013.01)

(58) Field of Classification Search
CPC .. A61M 16/20; A61M 16/201; A61M 16/202; A61M 16/203; A61M 16/204; A61M 16/205; A61M 16/206; A61M 16/207; A61M 16/208; A61M 16/209; A61M 16/0816; A61M 39/284; A61M 39/28; A61M 39/281; A61M 39/283; A61M 39/285; A61M 39/286; A61M 39/288; A61M 39/1011; A61M 2039/1016; A61M 1/83; F16B 7/0426; F16K 1/34; F16K 1/36; F16K 1/38; F16K 13/10; F16K 13/00; F16K 13/08; F16K 7/063; Y10S 128/912; Y10T 403/53; Y10T 403/535; F16L 37/0847

See application file for complete search history.

(56) References Cited

U.S. PATENT DOCUMENTS

| | | | | |
|---|---|---|---|---|
| 4,326,518 | A * | 4/1982 | Williams | A61M 39/288 604/533 |
| 2005/0253390 | A1* | 11/2005 | Blazek | A61M 39/1011 285/420 |
| 2007/0152443 | A1* | 7/2007 | Cheng | F16L 37/0847 285/317 |
| 2010/0234809 | A1* | 9/2010 | Kenley | A61M 39/281 604/180 |
| 2010/0258122 | A1* | 10/2010 | Boussignac | A61M 16/12 128/204.18 |
| 2013/0019867 | A1* | 1/2013 | Mashak | A61M 39/227 128/200.24 |

(Continued)

*Primary Examiner* — Joseph D. Boecker
*Assistant Examiner* — Brian T Khong

(57) ABSTRACT

The present disclosure provides a flow interruption valve comprising a first section permanently connected to the second section. The first section has a patient portion to connect to a corresponding tube of a patient, whereas the second section has a ventilator port to connect to a corresponding tube of a ventilator. The first section is further comprised of a compression system, which can be compressed to pinch an inner tube and prevent airflow from the ventilator to the patient and vice-versa.

16 Claims, 5 Drawing Sheets

(56) References Cited

U.S. PATENT DOCUMENTS

2013/0110087 A1* 5/2013 Kane .................... A61M 25/00
   15/104.03
2019/0388641 A1* 12/2019 Bowsher ............... A61M 16/06
2021/0338962 A1* 11/2021 Lau .................... A61M 16/0816

* cited by examiner

FLOW INTERRUPTION VALVE

CROSS REFERENCE TO RELATED APPLICATION

The present application claims priority to U.S. Provisional Application No. 63/143,129, entitled "FLOW INTERRUPTION VALVE" filed on Jan. 29, 2021, the contents of which are incorporated herein by reference in their entirety.

FIELD

The invention relates to the field of respiratory therapy and anesthesia devices, and more specifically to single use valves and adapters to provide temporary gas interruption.

BACKGROUND

As it is known to those in the respiratory care field, the management of patients on a mechanical ventilator is extremely complex. Patients often require transportation, or the removal or replacement of filters, changing of the ventilator circuit and other components, bronchoscopy, etc. For any of these procedures to be implemented, the patient must be physically disconnected from the mechanical ventilator.

Upon a ventilator circuit disconnection there are a number of potential problems, including contaminants or germs entering the patient, the collapse and re-expansion of the patient's lungs (known as a ventilator induced lung injury), escape of patient exhaled gases (that could expose health care workers to virus/bacteria or pharmaceuticals from within the patient), as well as the loss of positive end expiratory pressure (PEEP), which is not a desired result.

Currently, solutions to eliminate or reduce these problems include a standard disconnection of the patient from the ventilator. Some off label methods include the use of forceps to the patient's breathing tube and compress it to close it off. Unfortunately such a method is obviously quite dangerous.

In view of the above, a need exists for a standalone device (that could be incorporated into an endotracheal tube, suction or ventilation circuit) having the ability to temporarily interrupt ventilator gas flow maintaining homeostasis of gas within the patient's lungs that addresses one or more of the problems associated with a standard ventilator circuit disconnection. It would also be highly beneficial for the flow of air to be returned through to the patient once the ventilator is re-introduced into the respiratory system.

SUMMARY

In an aspect, the present disclosure provides a flow interruption valve comprising: a first section further comprising: a patient port; and, a compression system; a second section secured to the first section, the second section having a ventilator port; and, an inner tube allowing airflow from the first section to the second section, wherein the compression system is actuatable to prevent and allow airflow from the ventilator port to the patient port.

In another aspect, the present disclosure provides a method of assembling a flow interruption valve, the steps comprising: aligning arms of a second section with undercut portions of a first section, the arms terminating in inward projections; sliding the inward projections of the second section into the undercut portions of the first section, wherein the first section is permanently secured to the second section, and wherein an inner tube is positioned in between the first and second section to allow an airflow through the flow interruption valve.

In yet another aspect, a method of interrupting an airflow using a flow interruption valve, the steps comprising: connecting the flow interruption valve in between a ventilator and a patient; compressing a compression system of the flow interruption valve until an inner tube is bent and prevents the airflow through the inner tube; and, disconnecting the ventilator from the flow interruption valve.

BRIEF DESCRIPTION OF THE DRAWINGS

The following figures serve to illustrate various embodiments of features of the disclosure. These figures are illustrative and are not intended to be limiting.

DETAILED DESCRIPTION

The following embodiments are merely illustrative and are not intended to be limiting. It will be appreciated that various modifications and/or alterations to the embodiments described herein may be made without departing from the disclosure and any modifications and/or alterations are within the scope of the contemplated disclosure.

Figure 1:
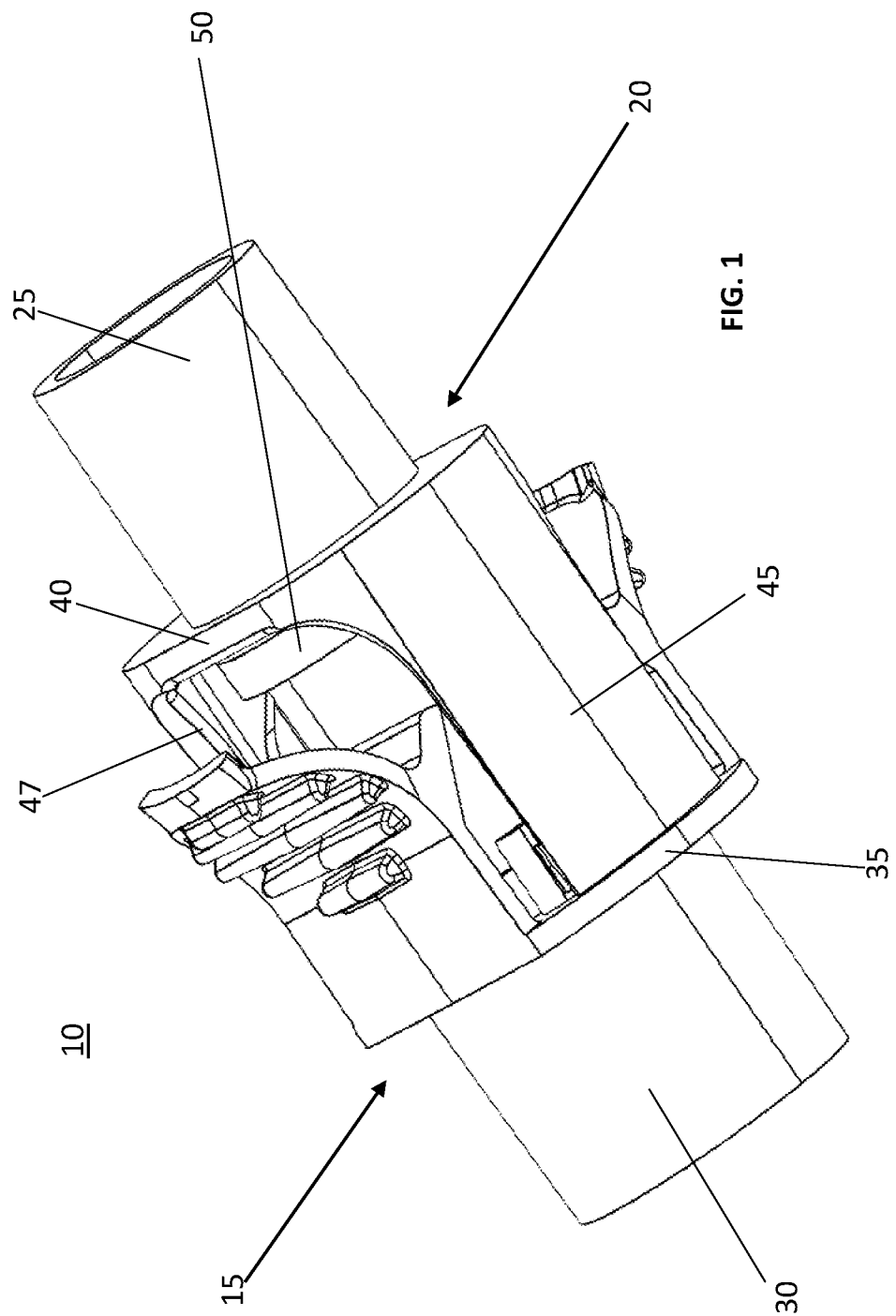
FIG. 1 is a first perspective view of a flow interruption valve according to an embodiment of the present disclosure.
Figure 2:
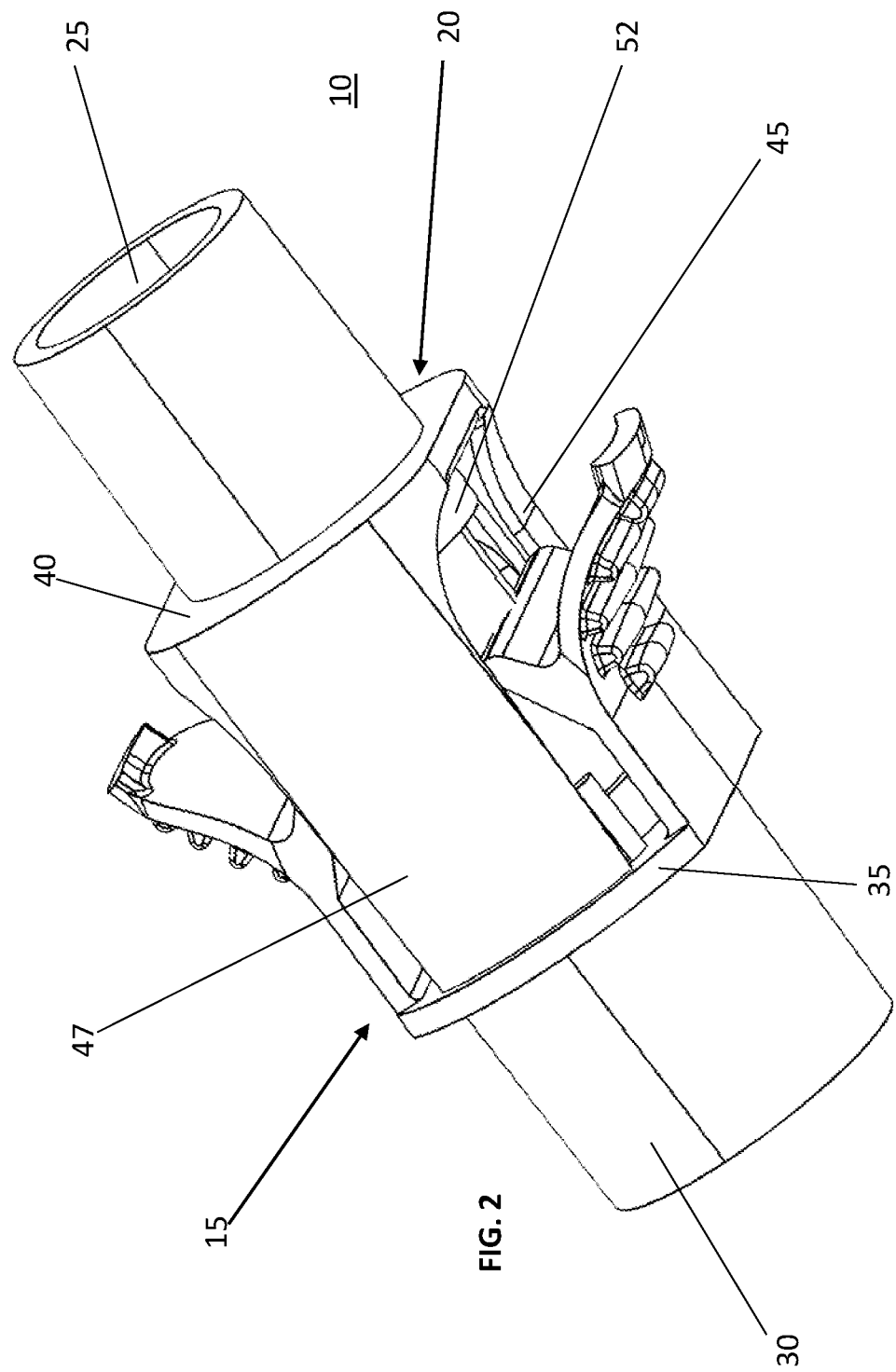
FIG. 2 is a second perspective view of the flow interruption valve of FIG. 1.

With reference to FIGS. 1 and 2 and according to an embodiment of the present disclosure, a flow interruption valve 10 is shown generally comprising a first section 15 configured to connect to a corresponding valve on the patient side (not shown) and a second section 20 configured to connect to a corresponding valve on the ventilator side (not shown). A worker skilled in the art would appreciate that in a preferred embodiment, the flow interruption valve 10 for use by a single patient only and not intended to be disconnected, cleaned and reused with other patients. It is an object of the flow interruption valve 10 to temporarily interrupt gas flow (such as air or oxygen) during the removal or replacement of components within an artificial ventilation system. Such temporary interruption of gas flow also importantly maintains pressure in the patient's lungs, which is desirable. The second section 20 is further comprised of a ventilator port 25 extending outwardly and being preferably tubular shaped. The first section 15 is further comprised of a patient port 30, the patient port 30 also extending outwardly and being preferably tubular shaped. The first section 15 is also comprised of a compression system 35, the compression system 35 actuatable to prevent and allow airflow from the ventilator port 25 to the patient port 30. The second section 20 is also comprised of an adapter 40, the adapter 40 further comprising a pair of arms 45, 47 to permanently attach the second section 20 to the first section 15. The arms 45, 47 are separated by receiving surfaces 50, 52 whose function shall be further described below.

Figure 3:
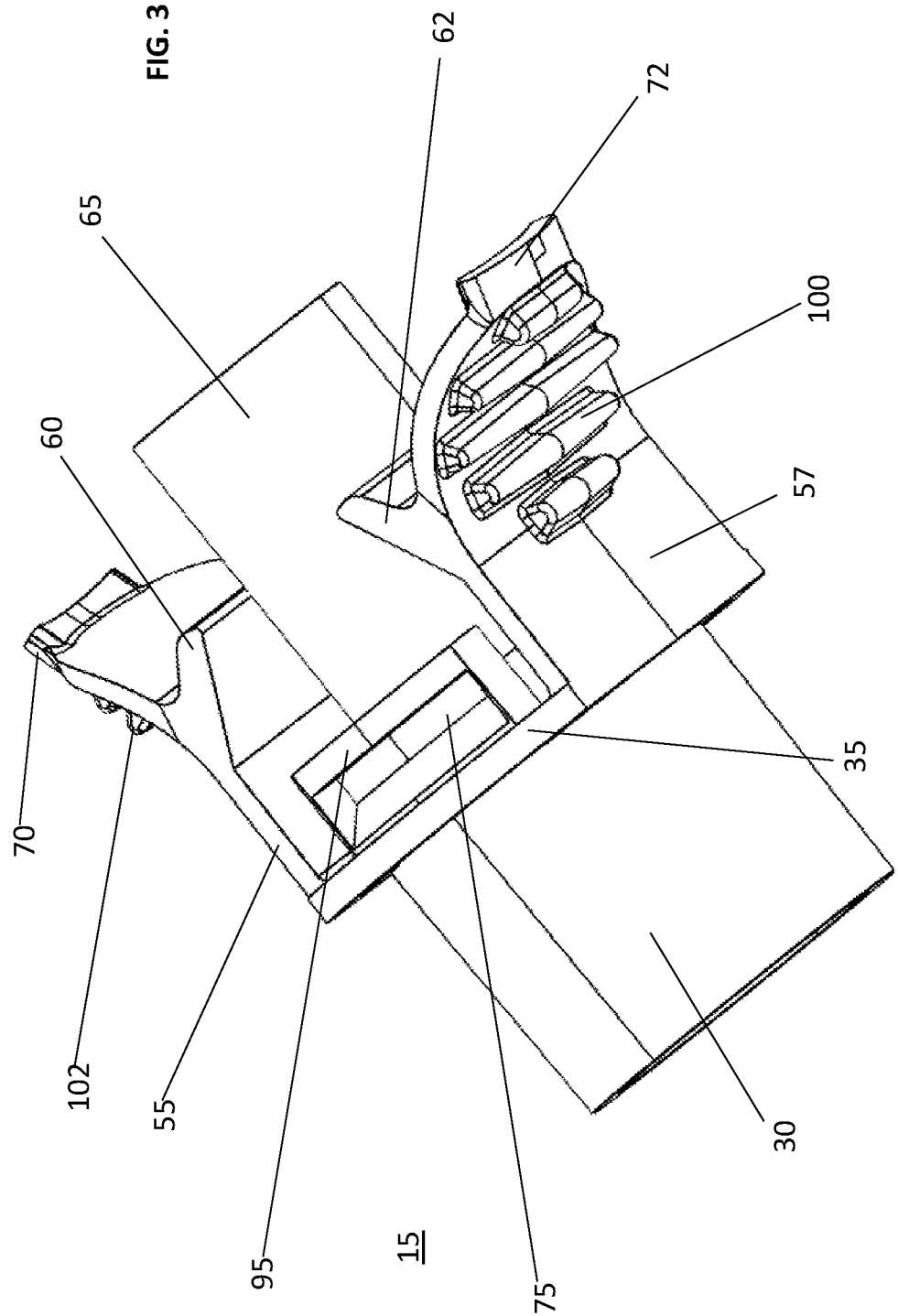
FIG. 3 is a perspective view of a first section and an inner tube of the flow interruption valve of FIG. 1.
Figure 4:
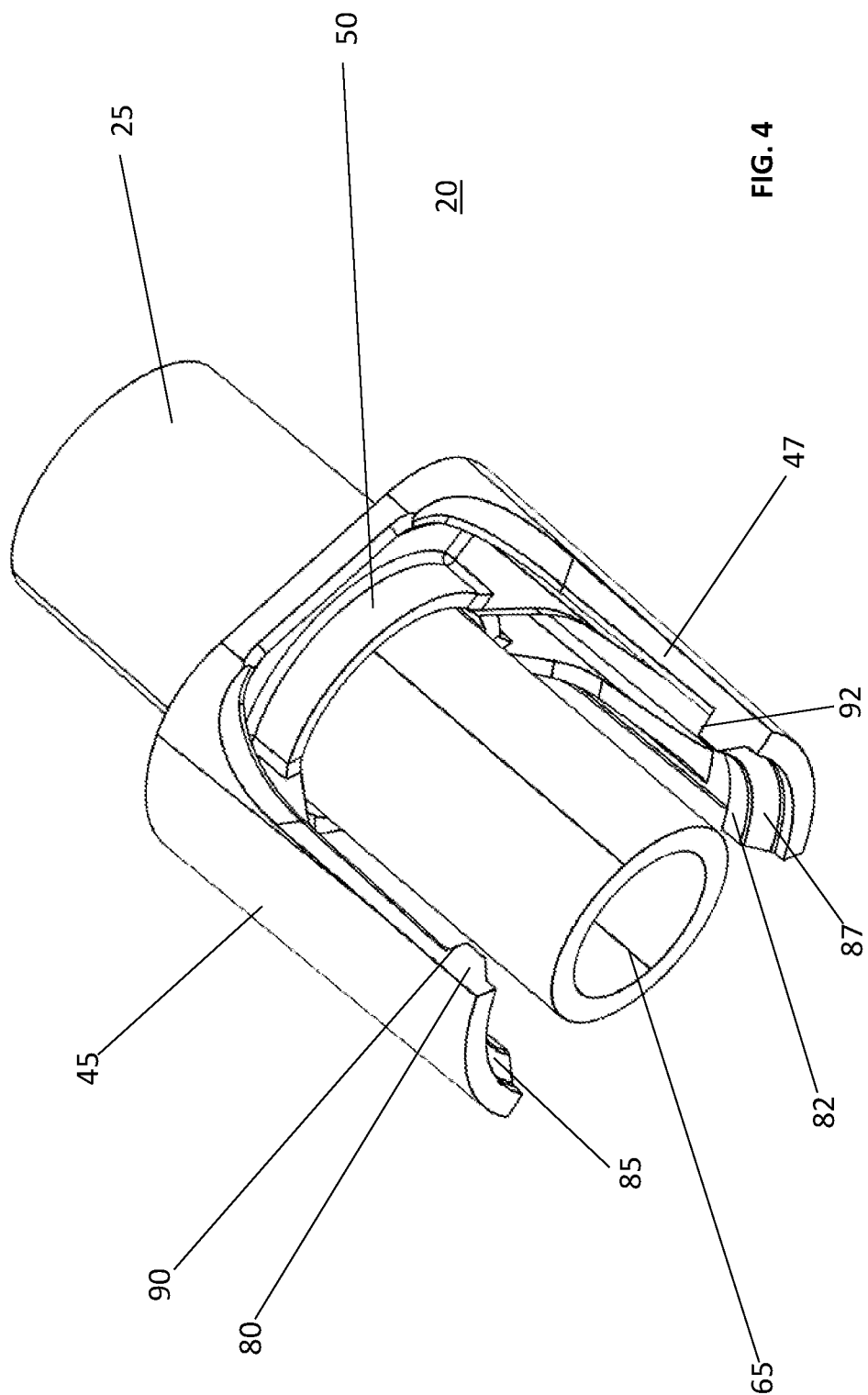
FIG. 4 is a perspective view of a second section and an inner tube of the flow interruption valve of FIG. 1; and, FIG. 5 is a perspective view of a flow interruption valve according to another embodiment of the present disclosure.

With reference to FIGS. 3 and 4 and according to an embodiment of the present disclosure, the first section 15 is shown comprised of the patient port 30 and the compression system 35. The compression system 35 is further comprised of flexible first and second tabs 55, 57, the first and second tabs 55, 57 having an outward curvature. Each one of the first and second tabs 55, 57 are further comprised of pressure members 60, 62 respectively. The pressure members 60, 62 are preferably made of a rigid material. When inward force is applied to the first and second tabs 55, 57, the members 60, 62 exert pressure onto and ultimately bend inwardly the inner tube 65 that is positioned in between first and second sections 15, 20. Gas such as air flowing through the patient port 30, into the inner tube 65 and through to the ventilator port 25 is temporarily stopped, until the first and second tabs 55, 57 are released by the operator. Each one of the first and second tabs 55, 57 terminate in tips 70, 72, respectively. The tips 70, 72 have a preferably semi-circular shape corresponding to first and second receiving surfaces 50 (52 shown in FIG. 2). During operation, the tabs 55, 57 are compressed maximally at a point where the tips 70, 72 flushly make contact with receiving surfaces 50, 52. At this point, the inner tube 65 is bent inwardly and airflow therein is prevented. Although this structural relationship between the tips 70, 72 and receiving surfaces 50, 52 is provided, a worker skilled in the art would appreciate that it is not intended to be limiting and that in all instances the tabs 55, 57 must be compressible until a point where the rigid pressure members 60, 62 fully compress the inner tube 65 such that airflow is no longer permitted. The first section 15 is also comprised of first undercut portion 75 and second opposed undercut portion (not shown). The undercuts 75 are constructed to receive corresponding projections 80, 82 of the second member. Indeed, the second member 20 is shown comprised of arms 45, 47 terminating in inner projections 80, 82, respectively. The inner projections 80, 82 have respective tapered portions 85, 87 terminating in lips 90, 92. To connect the first section 15 to the second section 20, the arms 45, 47 are aligned with undercut portions 75. The tapered portions 85, 87 slide over corresponding first rim 95 and second rim (not shown) of the first undercut portion 75 and second undercut portion (not shown) until the lips 90, 92 fit into the first undercut 75 and second undercut (not shown), respectively. At this moment, the first and second sections 15, 20 are connected one to the other. To ensure that the first and second sections 15, 20 connect to one another permanently, the area surrounding projections 80, 82 may be heated once the first and second sections 15, 20 are interconnected. This ensures that the first section 15 cannot be removed from the second section 20. In an optional embodiment, the tabs 55, 57 of the first section 15 have a plurality of ribs 100, 102 to provide additional grip when compressing the tabs 55, 57 inwardly.

Figure 5:
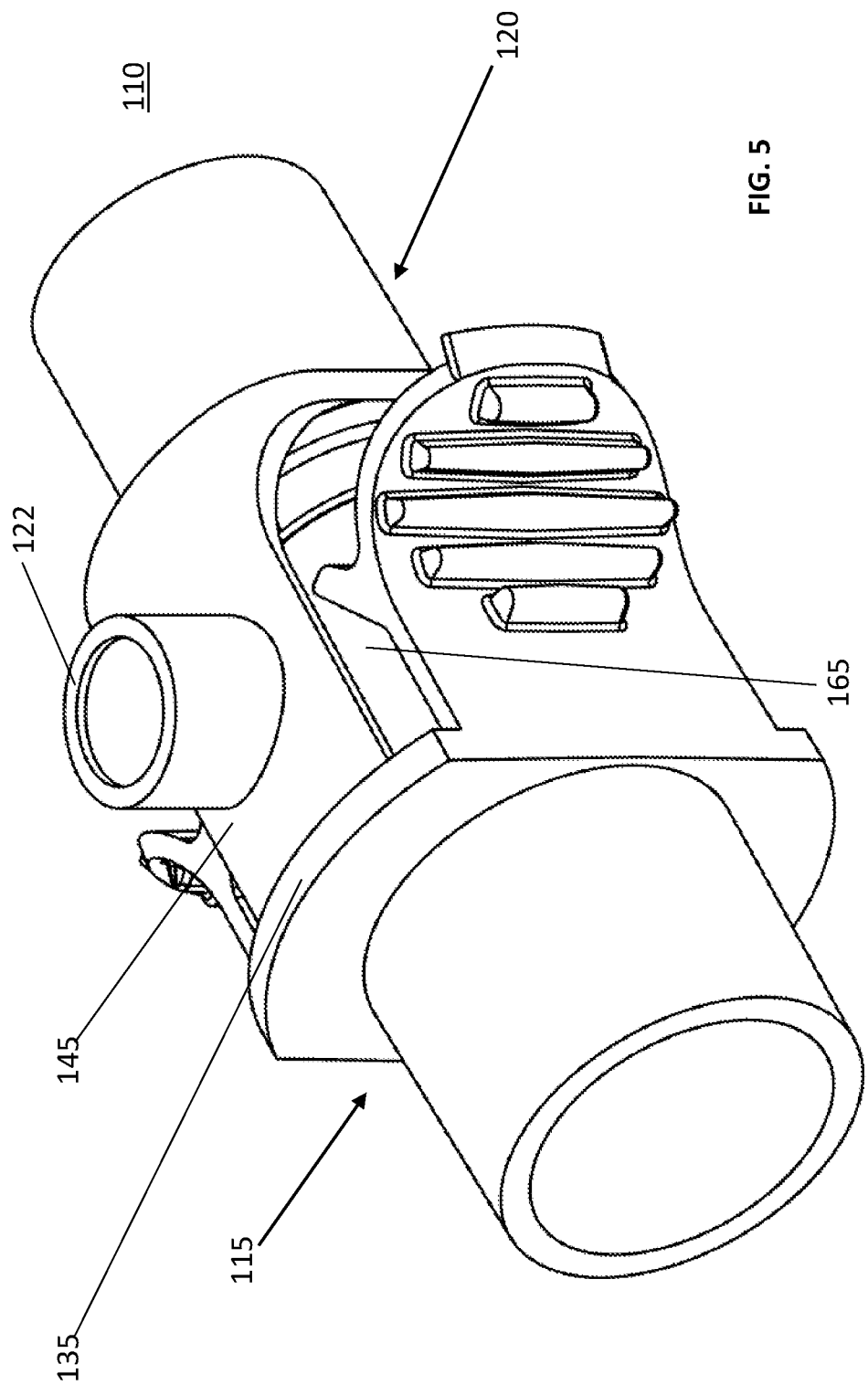

With reference to FIG. 5 and according to an alternate embodiment of the present disclosure, a flow interruption valve 110 is shown generally comprising a first section 115 configured to connect to a corresponding valve on the patient side (not shown) and a second section 120 configured to connect to a corresponding valve on the ventilator side (not shown). In this embodiment, the second section 120 is further comprised of a pressure relief valve 122 that is connected to the arm 145 and through into the inner tube 165. A worker skilled in the art would appreciate that the pressure relief valve 122 could also serve the purpose of being a gas sampling port. The relief valve 122 would have a standard construction as known in the art, and allow for gaseous blowout that may be caused, for example by the patient coughing once flow has been interrupted in the valve 110. The relief valve 122 would be preferably constructed closer to extremity of the arm 145, and in any embodiment, before the compression point of the compression system 135 on the inner tube 165 to allow for gas flow from the patient to be expelled through the relief valve 122.

Many modifications of the embodiments described herein as well as other embodiments may be evident to a person skilled in the art having the benefit of the teachings presented in the foregoing description and associated drawings. It is understood that these modifications and additional embodiments are captured within the scope of the contemplated disclosure which is not to be limited to the specific embodiment disclosed.

The invention claimed is:

1. A flow interruption valve comprising:
a first section further comprising:
a patient port; and,
a compression system;
a second section secured to the first section, the second section having a ventilator port; and,
an inner tube allowing airflow from the first section to the second section,
wherein the compression system is actuatable to prevent and allow airflow from the ventilator port to the patient port.

2. The flow interruption valve of claim 1 wherein the compression system further comprising:
a first tab further comprising a first pressure member; and,
a second tab further comprising a second pressure member,
wherein the first and second pressure members are configured to compress the inner tube and prevent airflow.

3. The flow interruption valve of claim 2 wherein the first and second tabs are further comprised of ribs to provide additional grip.

4. The flow interruption valve of claim 2 wherein the first and second tabs are further comprised of tips to contact the second section.

5. The flow interruption valve of claim 1 wherein the first section is further comprised of a pair of undercuts, each one of the undercuts having a rim.

6. The flow interruption valve of claim 1 wherein the second section is further comprised of first and second arms to permanently secure the second section to the first section.

7. The flow interruption valve of claim 6 wherein the first arm terminates in a first inner projection and the second arm terminates in a second inner projection, the first and second inner projections configured to fit within a pair of undercuts of the first section and permanently secure the first section to the second section.

8. The flow interruption valve of claim 7 wherein the first and second inner projections are further comprised of a tapered portion terminating in a lip to facilitate the fit of the first and second inner projections to the pair of undercuts.

9. The flow interruption valve of claim 1 further comprising a valve, the valve being at least one of: a pressure relief valve and a gas sampling port.

10. A method of assembling a flow interruption valve, the steps comprising:
aligning arms of a second section with undercut portions of a first section, the arms terminating in inward projections;
sliding the inward projections of the second section into the undercut portions of the first section,
wherein the first section is permanently secured to the second section,
and wherein an inner tube is positioned in between the first and second section to allow an airflow through the flow interruption valve.

11. The method of claim 10 further comprising the step of applying heat to the undercut portions to permanently seal the undercut portions to the inward projections.

12. The method of claim 10 further comprising a valve, the valve being at least one of: a pressure relief valve and a gas sampling port.

13. The method of claim 10 wherein the first section is further comprised of a compression system further comprising:
   a first tab further comprising a first pressure member; and,
   a second tab further comprising a second pressure member;
   wherein the first and second pressure members are configured to compress the inner tube and prevent airflow.

14. A method of interrupting an airflow using a flow interruption valve, the steps comprising:
   connecting the flow interruption valve in between a ventilator and a patient;
   compressing a compression system of the flow interruption valve until an inner tube is bent and prevents the airflow through the inner tube; and,
   disconnecting the ventilator from the flow interruption valve.

15. The method of claim 14 wherein the compression system is further comprised of:
   a first tab further comprising a first pressure member; and,
   a second tab further comprising a second pressure member;
   wherein the first and second pressure members are configured to compress the inner tube and restrict airflow.

16. The method of claim 14 further comprising a valve, the valve being at least one of: a pressure relief valve and a gas sampling port.

* * * * *